(12) United States Patent  (10) Patent No.: US 9,055,337 B2
Elliott et al.  (45) Date of Patent: Jun. 9, 2015

(54) PERSONALIZING SERVICES USING PRESENCE DETECTION

(71) Applicant: Cable Television Laboratories, Inc., Louisville, CO (US)

(72) Inventors: Isaac Elliott, Broomfield, CO (US); Garey Hassler, Castle Rock, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 13/792,089

(22) Filed: Mar. 10, 2013

(65) Prior Publication Data

US 2013/0312018 A1  Nov. 21, 2013

Related U.S. Application Data

(60) Provisional application No. 61/648,170, filed on May 17, 2012, provisional application No. 61/773,701, filed on Mar. 6, 2013.

(51) Int. Cl.

| | | |
|---|---|---|
| *H04H 60/56* | (2008.01) |
| *H04H 60/33* | (2008.01) |
| *H04H 60/45* | (2008.01) |
| *H04H 60/32* | (2008.01) |
| *H04N 21/45* | (2011.01) |
| *H04W 4/04* | (2009.01) |
| *H04N 21/422* | (2011.01) |

(52) U.S. Cl.
CPC ............... *H04N 21/45* (2013.01); *H04W 4/043* (2013.01); *H04N 21/42201* (2013.01)

(58) Field of Classification Search
CPC combination set(s) only.
See application file for complete search history.

(56) References Cited

U.S. PATENT DOCUMENTS

| 8,291,451 | B2* | 10/2012 | Roberts et al. | 725/40 |
| 2007/0011699 | A1* | 1/2007 | Kopra et al. | 725/22 |
| 2008/0046925 | A1* | 2/2008 | Lee et al. | 725/37 |
| 2010/0293570 | A1* | 11/2010 | Teraoka et al. | 725/31 |
| 2011/0047016 | A1* | 2/2011 | Cook | 705/14.13 |
| 2011/0271301 | A1* | 11/2011 | Kennedy | 725/38 |
| 2012/0112877 | A1* | 5/2012 | Gravino et al. | 340/4.31 |

* cited by examiner

*Primary Examiner* — Pinkal R Chokshi
*Assistant Examiner* — Alexander Gee
(74) *Attorney, Agent, or Firm* — Great Lakes Intellectual Property, PLLC.

(57) ABSTRACT

Presence detection having granularity sufficient to passively facilitate personalizing services according to particular individuals. Wireless signaling associated with individuals may be assessed to determine individual presence relative to a particular servicing device. The services accessed through the servicing device may be personalized according to an arrival and a departure of the individuals in order to vary services according to individual presence.

14 Claims, 6 Drawing Sheets

PERSONALIZING SERVICES USING PRESENCE DETECTION

CROSS-REFERENCE TO RELATED APPLICATIONS

This application claims the benefit of U.S. provisional Application Nos. 61/648,170, filed May 17, 2012, and 61/773,701, filed Mar. 6, 2012, the disclosures of which are incorporated in their entirety by reference herein.

TECHNICAL FIELD

The present invention relates to presence detection and service personalization, such as but not necessarily limited to personalizing services as a function of individuals determined to be present relative to one or more service providing devices.

BACKGROUND

A multiple system operator (MSO), an Internet service provider (ISP), a television service provider, a phone service provider or other provider of the electronically transmissible content may allow individuals or other consumers to subscribe to various types of services. Because consumers may subscribe to multiple service providers and/or to multiple types of services, the present invention contemplates enhance consumer experience with a personalized, customized service that adapts to preferences and behaviors of each individual user. First and foremost, personalized services should be designed to benefit the end user, with a secondary benefit to the service provider, content provider, and/or advertiser. When the user experience of the personalized service is clearly superior to legacy services, users may allow service providers to realize some financial benefits from the responsible and ethical collection and use of measurement data to customize the marketing of products and services.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
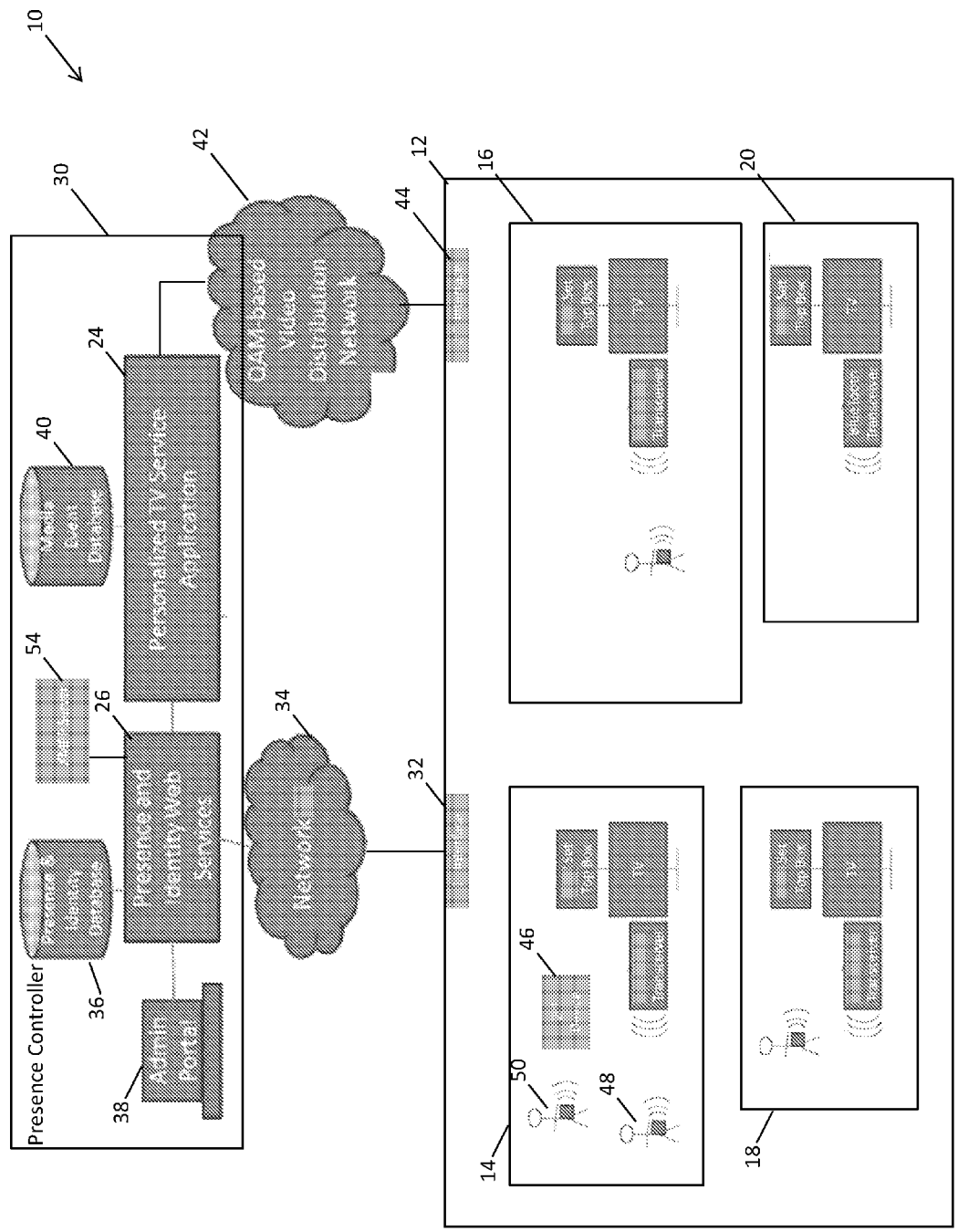
FIG. 1 illustrates a system for personalizing services in accordance with one non-limiting aspect of the present invention.

FIG. 1 illustrates a system 10 for personalizing services to a dwelling 12 in accordance with one non-limiting aspect of the present invention. The dwelling 12 is shown for exemplary non-limiting purposes to demonstrate the system 10 being configured to facilitate personalizing services according to occupant(s) presence within one or more of a plurality rooms 14, 16, 18, 20. The dwelling 12 illustrates one of many possible environments where a broad range of services available may be made available to a particular location and then subsequently personalized to a narrower range of services depending on occupant presence within certain portions of the dwelling. The services are shown to be personalized on a room-by-room basis such that the services within each room 14, 16, 18, 20 are personalized according to the room's occupant(s). This exemplary illustration is provided without intending to necessarily limit the present invention as other demarcations besides room boundaries may be used for personalization without deviating from the scope and contemplation of the present invention.

The room-by-room basis for personalization is predominately described with respect to personalizing television related services as one non-limiting aspect of the present invention contemplates allowing television service providers to personalize offerings according to occupants identified to be within each room 14, 16, 18, 20. The personalized offerings are intended to encompass any form of media, content, data, advertisement or other information made available to the dwelling, or particular users currently within with the dwelling 12, and are not necessary limited to the described television services. Each room 14, 16, 18, 20 is shown to include a presence detecting device (transceiver) configured to detect presence of occupants within the corresponding room as a function of wireless signaling, although each room 14, 16, 18, 20 need not necessary include a presence detecting device in order to facilitate room-by-room occupant detection. The wireless signaling used for presence detection may originate from wireless devices carried by the occupants. The occupants may carry a radio frequency identification (RFID) tag/transmitter, a mobile phone, a near field communication (NFC) device or other wireless device sufficient to facilitate transmission of the wireless signaling.

The wireless signaling may include information sufficient to facilitate distinguishing on occupant from another, optionally without specifically identifying the occupant. The use of the wireless device may be beneficial in allowing hands-free presence detection of the carrying occupant at least in that contemporaneous engagement may not be required to trigger presence detection after the wireless device is paired or otherwise associated with the presence detecting device. While the present invention contemplates the presence detection devices or other devices within one or more of the rooms 14, 16, 18, 20 being manually engaged to trigger presence detection, such as in the event the occupant is not currently in possession of a suitable wireless device, automatic emittance of the wireless signaling may be preferred in order to minimize user operations. Once presence detection is enabled with one or of the presence detecting devices within the dwelling 12, the other presence detection devices may be notified to facilitate presence detection in the corresponding rooms.

Optionally, the wireless devices may be paired with presence detecting devices in other dwellings (not shown) to facilitate similar operations therein. The wireless devices may be configured to periodically transmit wireless signaling for receipt by the presence detecting devices. A power level of the wireless signaling and/or a capability of the presence detecting devices to receive the wireless signaling may be adjusted according to a size of each room. The wireless signaling range of the wireless devices and/or the presence detecting devices may be adjusted in order to limit the likelihood that a single occupant is determined to be present in multiple rooms at the same time. A range testing operation may be conducted between the wireless devices and the presence detecting devices within each room in order to facilitate establishing the wireless communication ranges. Optionally, the presence detecting devices may include an application through which instructions can be provided to occupants to facilitate establishing the wireless communication ranges.

The presence detecting devices may be configured to facilitate detecting presence of one or more occupants within each of the rooms 14, 16, 18, 20. The presence detection may then be used to facilitate personalizing services provided through a television or other interface of the occupied room. The present invention is not necessarily limited to facilitating personalization of services provided through televisions and fully contemplates its use and application in facilitating personalization of other types of services, which may not necessarily be interfaced through a television. The televisions are shown for exemplary non-limiting purposes to demonstrate one type of device through which network services may be interfaced. While the television is shown to standalone from other user controllable devices, the television need not be a standalone component and may be integrated in any other type of device, including but not limited to a computer, a mobile phone, a tablet computer, etc. A set top box (STB) is shown to be associated with each of the televisions to facilitate interfacing television related signaling. The STB or other suitable gateway may be associated with the television to descramble, to provide encryption or to otherwise facilitate processing of service related signaling. The STB is shown to be separate from the television for exemplary non-limiting purposes as its function may be integrated with each television and/or its use may be omitted.

The television services may be personalized according to information received at a personalized television (TV) service application 24. The personalized TV service application 24 may be configured to facilitate personalizing the television services according to presence information received from a presence and identity Web services 26. The personalized TV service application 24, the presence and identity Web services 26 and the other illustrated components may be included as part of a presence services controller 30. The controller 30 may include a computer-readable medium having non-transitory instructions stored thereon, which operate with a processor, to facilitate the operations contemplated by the present invention. The presence and identity Web services 26 may be a Web-based server or other device configured to receive notification messages from the presence detecting devices. The notification messages may correspond with an arrival message and a departure message transmitted from one or more of the presence detecting devices to announce arrival and departure of occupants within the rooms. Each presence detecting device may be configured to transmit one or more of the notification messages upon detecting the arrival and departure of occupants. The notification messages may include an identifier for the detected wireless signaling and an identifier of the room for which the arrival and/or departure was detected. One non-limiting aspect of the present invention contemplates the presence detecting devices being configured to transmit the notification messages through a first network interface 32.

The first network interface 32 may be configured to facilitate exchanging signals between the presence detecting devices within the dwelling 12 and a first network 34 external to the dwelling. A first inside network (not shown), such as a wireless or wired network, may be included within the dwelling to facilitate interconnecting each of the presence detecting devices with the first network interface 32. One non-limiting aspect of the present invention contemplates the first network interface 32 being sufficient to facilitate exchanging Internet protocol (IP) layer messaging between the first network 34 and the presence detecting devices. The first network 34 may be configured as an IP-based network having capabilities sufficient to facilitate IP layer message exchange according to according to Hypertext Transfer Protocol (HTTP), the disclosure of which is hereby incorporated by reference in its entirety. The use of an IP-based network to facilitate IP-layer messaging may be beneficial in allowing the presence detecting devices to facilitate communications according to commonly used networking protocols and/or to allow manufacturers to provide off-the-shelf devices to facilitate the contemplated presence detection without requiring such devices to support proprietary communication protocols and messaging commonly employed by television service providers.

The presence and identify Web services 26 may be configured to process information included in the notification message to facilitate determining presence and identity of the occupants. In order to insure occupant security and integrity of collected information, the notification message may include non-descriptive identifiers generated for the occupant originating wireless signaling. The non-descriptive identifiers may be beneficial in preventing use of the underlying information in the event one of the notification messages was to be intercepted by an unintended third party. A presence and identity database 36 may include information sufficient to relate the identifying information in the notification messages to particular uses. The presence and identity database 36 may be securely maintained to protect the identity of registered users. An admin portal 38 may be included to facilitate administering the presence and identify information included in the presence and identity database 36. The admin portal 38 may be in the control of a service provider (not shown) responsible for providing the services to the dwelling for personalization. Optionally, in the event the personalization is being used to control a device to personalize content provided from other service providers, the admin portal 38 may be associated with a trusted authentication service or other trusted third party.

The presence and identity Web services 26 may cooperate with the admin portal 38, presence and detecting database 36, backend infrastructures and the like to facilitate determining identification information for particularly dwelling occupants. Optionally, the occupants may provide profiles or other identifying information to facilitate the contemplated identification, such as but not necessarily limit to preference related information representative of the occupant preferences for personalization. The identifying information, and optional preferences, may be provided from the presence and identity Web services 26 to the personalized TV service application 24. The personalized TV service application 24 may use this information to generate personalization information. The personalization information may then be provided on a room-by-room basis to the television in order to personalize the television service relative to the corresponding room occupant(s). A media database 40 may cooperate with the personalized TV service application 24 to facilitate personalizing various television services or other related media according to the particular room occupants, e.g., to personalize content advertised or made available to each room 14, 16, 18, 20 according to the personal preferences of the user identified therein.

A quadrature amplitude modulated (QAM) based video distribution network 42 is shown to facilitate interfacing the television services with the dwelling. A second interface 44 at the dwelling 12 may be configured to facilitate interfacing the television services related signaling with each of the STBs. A second inside network (not shown), such as a wireless or wired network, may be included within the dwelling to facilitate interconnecting each of the STBs with the second network interface 44. One non-limiting aspect of the present invention contemplates the second network interface 44 being sufficient to facilitate exchanging non-IP layer messaging between the QAM network and the STBs. The QAM network may be configured as a non-IP based network having capabilities sufficient to facilitate non-IP layer message exchange according to according to Enhanced Binary Interchange Format (EBIF), the disclosure of which is hereby incorporated by reference in its entirety. The use of a non-IP-based network to facilitate non-IP layer messaging may be beneficial in allowing the STBs to facilitate communications over legacy networks commonly employed by television service providers to transmit television signaling over proprietary communication mediums. This may be beneficial in allowing the present invention to operate with legacy and/or deployed STBs without requiring the STBs to support IP-based messaging or communications over IP networks and/or IP messaging layers.

While the system in FIG. 1 differentiates between IP based networking and non-IP-based networking, the present invention is not necessarily so limited and fully contemplates its use and application in facilitating personalization according to messaging exchange over similarly configured networks and/or over a single network. In particular, one non-limiting aspect of the present invention contemplates the first interface 32 and the second interface 44 being combined into a single interface and/or the first and second interface 32, 44 being replaced with a single interface sufficient to facilitate IP-based messaging. The IP-based messaging configuration may be beneficial in environments where legacy constraints for the television or other interfacing device are not so limiting and/or where such devices may be configured to facilitate IP-based messaging. Such an all IP-based configuration may provide better long-term implementation and/or implementation with other content sources that do not rely upon proprietary television communication mediums and/or those which are not capable of transmission over such television communication mediums, e.g., for use in personalization of services streamed, downloaded or otherwise delivered over the Internet to televisions or other devices within the dwelling.

The services personalization may include room-level personalization for secondary devices 46, such as but not necessarily limited to tablets, smartphones, computers and/or other devices that may be configured to supplemental occupant experience relative to content interfaced through the television or otherwise being delivered by the service provider. Such secondary device personalization may cooperate with the personalization provided through the television and/or operated independently thereof, such as to personalize services to a different room occupant, i.e., services interfaced through the television could be personalized to a first room occupant 48 and services interfaced through the secondary device 46 could be personalized to a second room occupant 50. The secondary device personalization may be achieved with secondary personalization message communicated from the personalization TV service application 24 and/or an Extensible Messaging and Presence Protocol (XMPP) server 54 to the relevant secondary devices. Optionally, the secondary personalization message may be transmitted to the secondary device 46 using backchannel communication, such as but not necessarily limited to that described in U.S. patent application Ser. No. 13/534,238, the disclosure of which is hereby incorporated by reference in its entirety.

The personalized TV service application 24 and/or the other resources contemplated by the present invention may be configured in accordance with the contemplated concepts to use the knowledge and other information associated with presence of the room occupants, along with that user's recorded preferences and usage history, to create a personalized service for the user. In particular, the system 10 may be beneficial in personalizing video services, including, but not limited to: recommended programming; personalized programming guide; links into social networking tools so that the user can see what his or her friends watched and liked, or can see what friends are watching right now; automatically tuning the channel to the program that the user usually watches at this time of day and day of week; automatically generating playlists of recommended programming based upon user preferences and viewing history; targeting specific advertisements to the user based upon preferences, viewing history, psychographic or demographic information, and other externally-supplied information about the user; and/or supplying de-identified and aggregated statistics to advertisers, agencies, marketers, content packagers and content creators.

Figure 2:
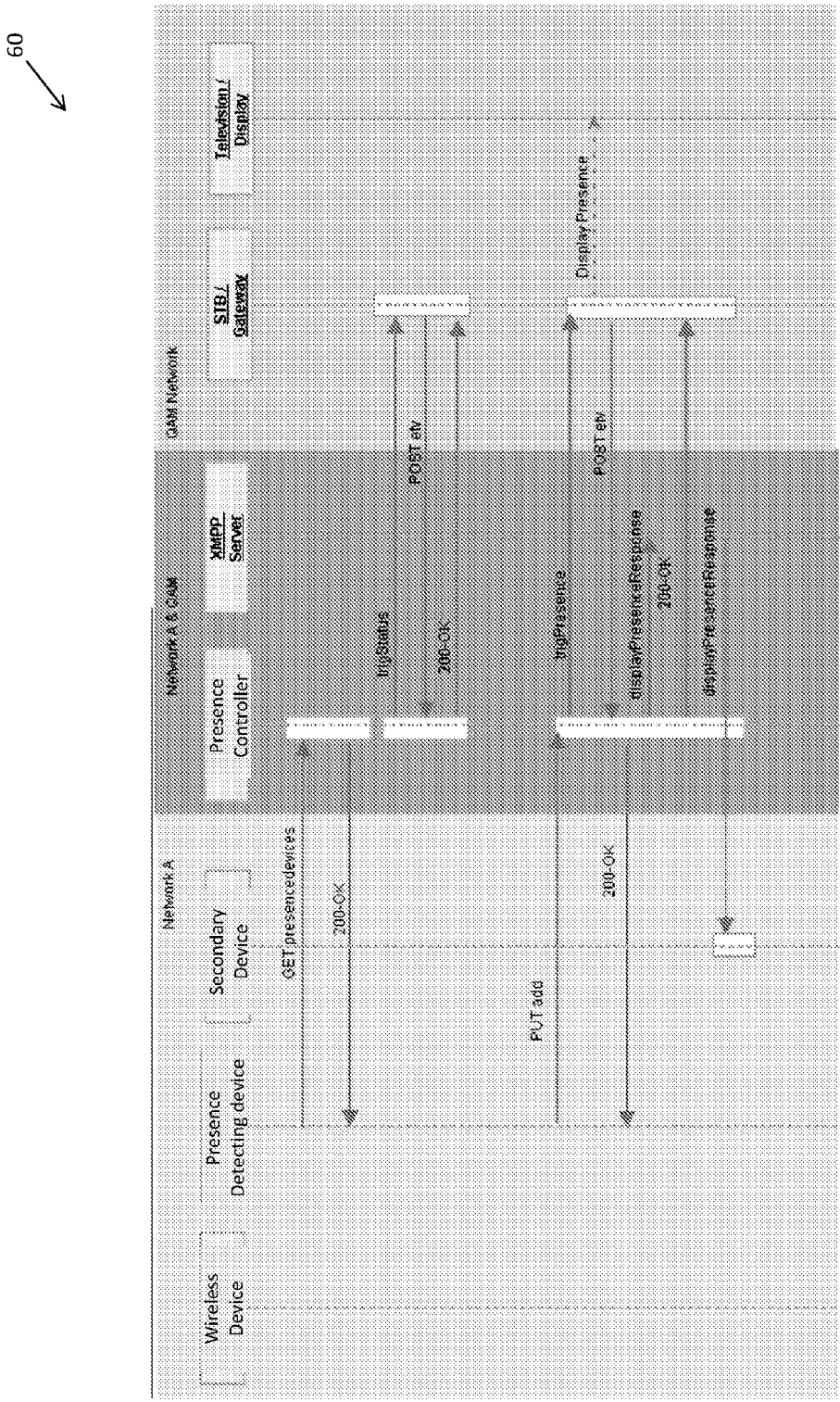
FIG. 2 illustrates a sequence diagram for initialization and adding new presence detecting devices in accordance with one non-limiting aspect of the present invention.

FIG. 2 illustrates a sequence diagram 60 for initialization and adding new presence detecting devices in accordance with one non-limiting aspect of the present invention. The sequence diagram is described for exemplary non-limiting purposes with respect to the occupant carried wireless devices being Bluetooth/RFID devices and the presence detecting devices being correspondingly configured Bluetooth/RFID transceivers. The sequence diagram also describes the initialization and addition of new presence detecting devices relative to a single device, however, similar processes may be conducted with any number of devices, optionally simultaneously. The initialization and adding new presence detecting devices may be used to associate each presence detecting device with one or more occupant devices. The process may be used to pair the occupant devices with one or more of the presence detecting devices and/or to notify the presence detecting devices of existing occupant devices and/or new occupant devices for which services should be personalized. This can be beneficial in allowing the presence detecting devices to discern the occupant devices for which presence detection should be performed from those for which presence detection is unnecessary or undesirable.

The sequence diagram includes a network identifier to identify the network or combination of networks over which corresponding messaging and communications may take place to facilitate the contemplated operations (e.g., Network A, Network A & QAM, QAM Network). The network identification may be beneficial as one non-limiting aspect of the present invention contemplates a particular network configuration and system implementation where interfaces, translations and other operations may be performed to facilitate messaging and signaling for use with specific devices. The architecture may be particularly beneficial in defining interactions contemplated by the presence invention to facilitate personalization according to certain restrictions and operational limitations/capabilities of the noted devices, such as but not limited to facilitating personalization with legacy systems and devices without requiring software updates and/or component replacement.

The presence detecting device may communicate a GET presencedevices message to the presence controller, which may be communicated through the first interface according to HTTP. The GET presencedevices message may be used to facilitate identifying the presence detecting device to the presence controller. This may be done to identify the presence detecting devices authorized for use in facilitating the contemplated personalization. The presence detecting device may be configured to transmit the GET presencedevices message automatically upon power up, and response to user interaction with the presence detecting device and/or as a function of other triggering events. If the presence detecting device has been authorized previously by the presence Web services to facilitate presence determinations, a 200-OK message may return to confirm its operational status. While not shown, the presence detecting device may initiate an authentication procedure or other authenticating event to facilitate authenticating itself to the presence controller, including exchanging information sufficient to identify a particular room having the presence detecting device, a subscriber associated with the dwelling and/or other information to facilitate the room-level personalization contemplated by the present invention.

The presence controller may communicate a trigStatus message to the STB. The trigStatus message may be used to request enhance television (ETV) related information from the STB. The trigStatus message may be communicated to the STB through the second interface and formatted according to EBIF. The STB may provide the ETV related information in a POST ETV message communicated through the first interface and defined according to HTTP. The POST ETV message may identify an IP address, port and/or other information for the STB within the room of the presence detecting device communicating the GET presencedevices message. The presence controller may respond with a 200-OK message to confirm receipt of the necessary STB related parameters. The messages exchange between the presence controller and the STB may occur through the first and second interfaces in order to work within message protocol limitations/capabilities of the STB and to facilitate exchanging information sufficient to facilitate subsequent personalization of services through corresponding manipulation of the STB.

The presence detecting device may communicate a PUT add message to the presence controller to associate itself with one of the STBs. The PUT add message may be communicated to the first interface and defined according to HTTP. The presence controller may transmit a trigPresence message to the STB identified in the PUT add message. The trigPresence message may be transmitted through the second interface and defined according to EBIF. The trick message may be used to notify the STB to display a notification message when the corresponding presence detecting device determines presence of an occupant within the corresponding room. The notification message may initially be a confirmation message to notify the occupant currently in the room that they have been identified for personalization. The STB may transmit a DisplayPresence message to the television or other display used to interface the services. The DisplayPresence message may include the notification information to be displayed to the occupant to confirm presence detection. The DisplayPresence message may be beneficial in notifying the occupant that they have been enrolled in presence detection processes. A POST ETV message may be communicated from STB to the presence controller to confirm output of the DisplayPresence message.

The presence controller may transmit a displayPresenceResponse to the XMPP server to facilitate notifying a secondary device within the corresponding room of enrollment of the occupant in the presence detection processes. The presence controller may also transmit a 200-OK message to the STB to confirm receipt of the POST ETV message. The XMPP server may transmit a displayPresenceResponse message to the secondary device. The displayPresenceResponse message may be similar to the DisplayPresence message transmitted to the television in order to prompt the secondary device to provide a notification message. The notification message interfaced through the secondary device may be similarly perform a notification process to notify enrollment in the presence detection processes. Optionally, the XMPP server may detect presence of the secondary device prior to transmitting the corresponding messages. The presence of the secondary device may be determined by the presence detecting device and/or through other processes executed between the XMPP server and the secondary device.

As noted, the sequence diagram associated with FIG. 2 generally relates to facilitating authentication of each presence detecting devices within the dwelling relative to one or more televisions included within rooms of the dwelling. The related sequencing may also be used to notify the presence detecting devices of wireless devices or other occupant devices to be detected for presence and/or messages to be output through the corresponding one of the STBs to notify occupants of future presence detections. The ability to notify occupants of future presence detections may be beneficial when adding wireless devices to the presence detection system in order to ensure integrity of the present detecting system and user awareness. Optionally, and opt-out teacher may be included to provide users the opportunity to cease further presence detection and/or to temporarily opt out of presence detection. While the initialization and adding new presence detection sequence is described with respect to certain messages being defined according to HTTP and other messages being defined according to EBIF, this is done for exemplary non-limiting purposes as the present invention fully contemplates other messaging exchanges to facilitate the contemplated registration and notification processes.

Figure 3:
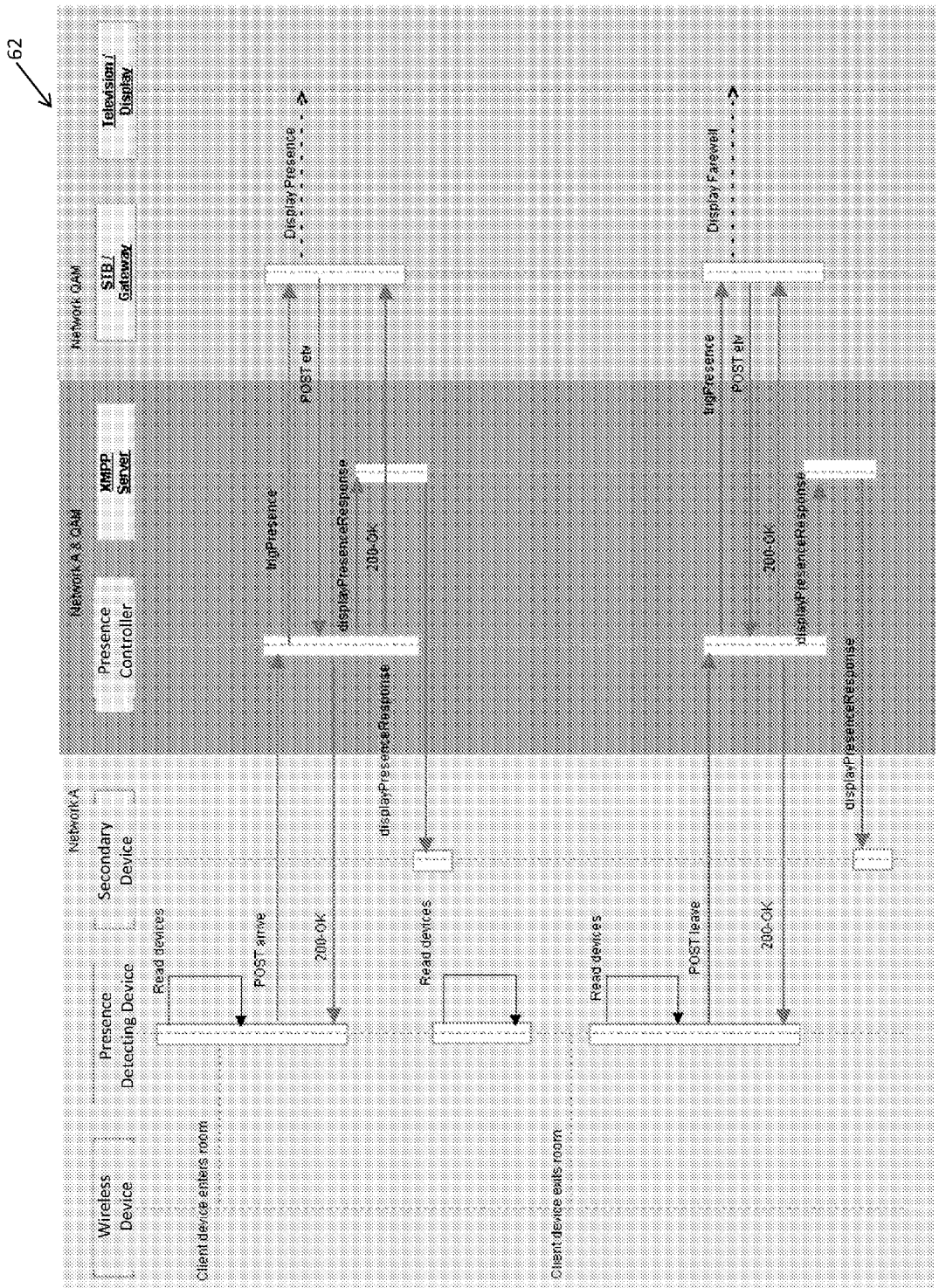
FIG. 3 illustrates a presence detection sequence diagram in accordance with one non-limiting aspect of the present invention.

FIG. 3 illustrates a presence detection sequence diagram 62 in accordance with one non-limiting aspect of the present invention. The presence detection sequence diagram relates to a method for facilitating presence detection on a room-level basis, which may be used to facilitate personalizing services accessed through televisions within each room according to presence of various room occupants. The presence detecting devices within a dwelling may perform AV devices operation to detect when an occupant carrying a wireless device enters one of the rooms. The presence detecting device within the room or otherwise configured to monitor wireless signaling at a room-level made be configured to transmit a POST arrive message through the first interface according to HTTP after detecting presence of the wireless signaling. The POST arrive message may include identifying information associated with the wireless device, which optionally uniquely identify the wireless device without identifying the user associated therewith. The presence controller may communicate a 200-OK message to the presence detecting device through the first interface according to HTTP and upon receipt of the POST arrive message in order to confirm the identified wireless device is enrolled in presence detection personalization.

Figure 4:
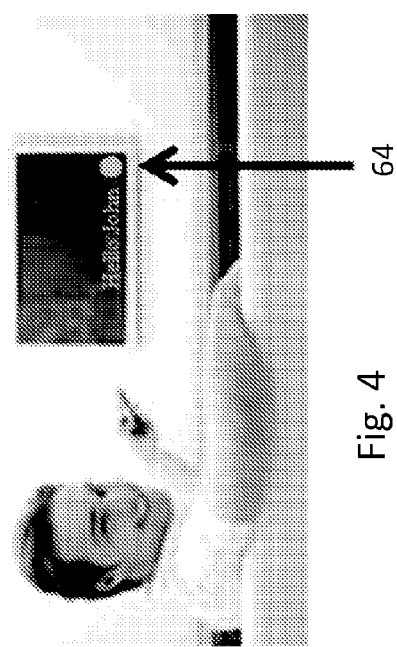
FIG. 4 illustrates display of a greeting message in accordance with one non-limiting aspect of the present invention.

The presence controller may communicate a trigPresence message to the STB associated with the room of the presence detecting device sourcing the POST arrive message. The trigPresence message may be transmitted through the first interface and defined according to EBIF to include identifying information specific to the occupant associated with the detected wireless device. The trigPresence message may include personalization information sufficient for use in personalizing services accessed through the STB. The STB may automatically process the personalization information in order to personalize user interaction with the STB and/or television. Optionally, a DisplayPresence message may be communicated from STB to the television to provide a greeting message or other notification sufficient to notify the occupants that their presence has been detected. FIG. 4 illustrates a greeting message 64 displayed in response to receipt of the DisplayPresence message in accordance with one non-limiting aspect of the present invention. The greeting message 64 may be displayed through the television and include information uniquely identifying the occupant, which for exemplary purposes is shown to correspond with displaying a "Hello John" message.

Returning to FIG. 3, the STB may transmit a POST ETV message through the first interface according to HTTP in order to confirm successful implementation of the personalization services and/or output of the DisplayPresence message. The presence controller may transmit a 200-OK message through to the STB to confirm receipt of the POST ETV message. As noted, the personalized services may include the STB triggering any number of controllable events according to occupant presence. The variability of the personalized services may be particular to the services requested for access and/or according to preferences previously associated with the occupant. In the event multiple occupants are determined to be present within the same room at the same time, the presence controller may undertake a conflict resolution process to determine which one or more of the occupants should control personalization. The presence controller may generate trigPresence message after performing the conflict resolution process such that the corresponding personalization information takes into account the occupant determined to have priority. In the event a secondary device is determined to be proximate the STB and/or the presence detecting device, the presence controller may transmit a displayPresenceResponse to the XMPP server to trigger transmission of a corresponding displayPresenceResponse message to the secondary device.

The foregoing sequences described with respect to FIG. 3 may be continuously repeated on a room-by-room basis to facilitate detecting entrance of room occupants and corresponding personalization. The presence detecting devices may continuously poll for wireless signaling in order to identify newly entering devices and/or exiting devices. A wireless device may be determined to be entering and exiting a room depending on wireless signaling received by one or more of the presence detecting device. Depending on presence detecting device settings and/or sensitive, two or more presence detecting devices may detect the same occupant device. The movement of such occupant devices may be tracked to identify a most likely room for the occupant (e.g., the room to which the occupant is traveling towards) and/or signaling strength may be similarly used to identify the most likely room (e.g., the room having the strongest signaling). If the event presence is no longer detected, such as if the occupant leaves a room or if the occupant device ceases transmission of the wireless signaling, a de-personalization may occur.

The presence detecting device failing to detect continued presence of an occupant may transmit a POST leave message to the presence controller through the first interface according to HTTP and similarly receive a confirming 200-OK message. The POST leave message may identify the occupant device without specifically identifying the associated user. The POST leave message may prompt to the presence controller to transmit a trigPresence message to the corresponding STB through the second interface according to EBIF. The trigPresence message may include de-personalization information for use in instructing the STB to de-personalize services. Optionally, the de-personalization information may include instructions for the STB to provide a DisplayFarewell message to the television for displaying a farewell message to the occupant, such as "Good Bye John". The farewell message may be beneficial in providing supplemental notification to the occupant that presence detection, at least within the corresponding room, has terminated. The farewell may be particularly use if the occupant desired to remain within the room and to access services without the personalization constraints.

The STB may transmit a POST ETV message through the first interface according to HTTP to confirm de-personalization and similarly receive a 200-OK confirmation from the presence controller. Depending on whether the exiting occupant was also associated with services personalize through a secondary device, the presence controller transmit a displayPresenceResponse message to the XMPP server. The XMPP server may then transmit a displayPresenceResponse message to secondary device to provide de-personalization information to the secondary device. The de-personalization information may be used to instruct the second device to cease personalizing an application or other feature provided through the secondary device and/or to display a farewell message. While the presence detection sequence is described with respect to certain messages being defined according to HTTP and other messages being defined according to EBIF, this is done for exemplary non-limiting purposes as the present invention fully contemplates other messaging exchanges to facilitate the contemplated presence detection.

Figure 5:
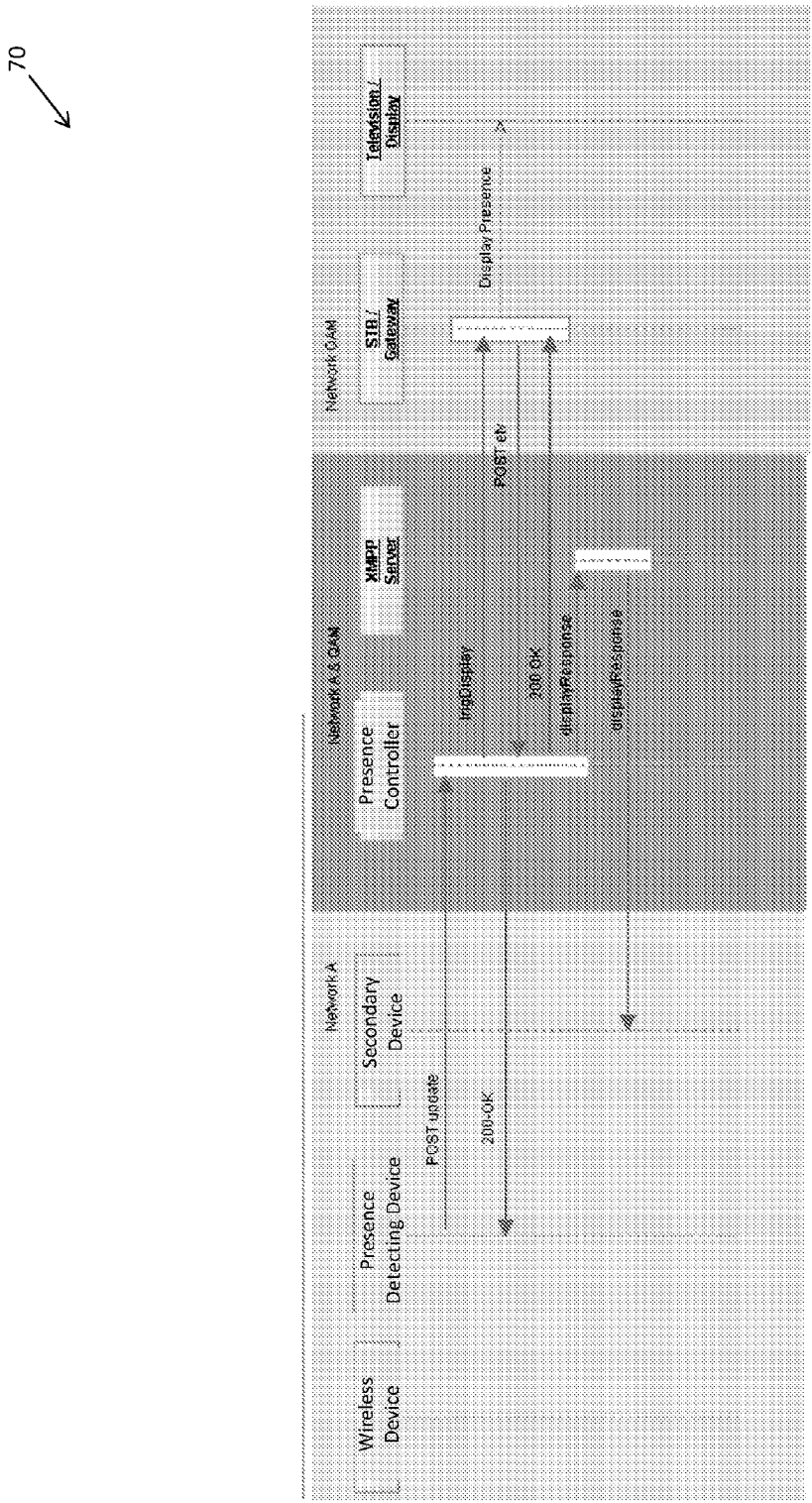
FIG. 5 illustrates a replace presence detection sequence diagram in accordance with one non-limiting aspect of the present invention.

FIG. 5 illustrates a replace presence detection sequence diagram 70 in accordance with one non-limiting aspect of the present invention. The replace presence detection system may be used to notify the presence detecting device to cease future presence determinations for one or more wireless devices. The presence detecting device may receive instructions from a user to permanently or temporarily block presence detection operations whereby the presence controller may prevent further personalization while maintaining records and other information previously associated with the corresponding user and/or wireless device. This may include updating the presence and identity database to retain the presence related information while preventing personalization until presence detection is re-activated. The presence detecting device receiving deactivation instructions may communicate a POST update message to the presence controller. The POST update message may include information sufficient to identify the corresponding wireless device without identifying the user associated therewith. The presence detecting device may communicate the POST update message to the presence controller through the first interface according to HTTP.

The presence controller may transmit a trigDisplay message to the STB through the second interface according to EBIF to which the STB response with a similarly transmitted 200-OK message to confirm receipt. The trigDisplay message may include replacement information sufficient to notify the STB that the personalization status for the wireless device has been replaced and changed to be inactive. The replacement information may include instructions for the STB to provide a DisplayPresence message to the television for prompting display of a corresponding notification message. The notification message may be used to convey replacement of account status to the room occupant or to otherwise facilitate notifying the user associated with the wireless device that presence detection will no longer be performed. Optionally, an interface may be provided for the user to confirm deactivation to the STB and/or to specify parameters of the deactivation, such as to select on a room-by-room the rooms for which presence detection is to be deactivated and the rooms, if any, for which presence detection may continue. The presence controller may transmit a displayResponse message to the XMPP server to prompt transmission of another displayResponse message to a secondary device within the room of the wireless device or outside of the room and associated with the wireless device. The displayResponse message may be used to appraise the XMPP service of the replaced status and to facilitate corresponding notification through the secondary device.

Figure 6:
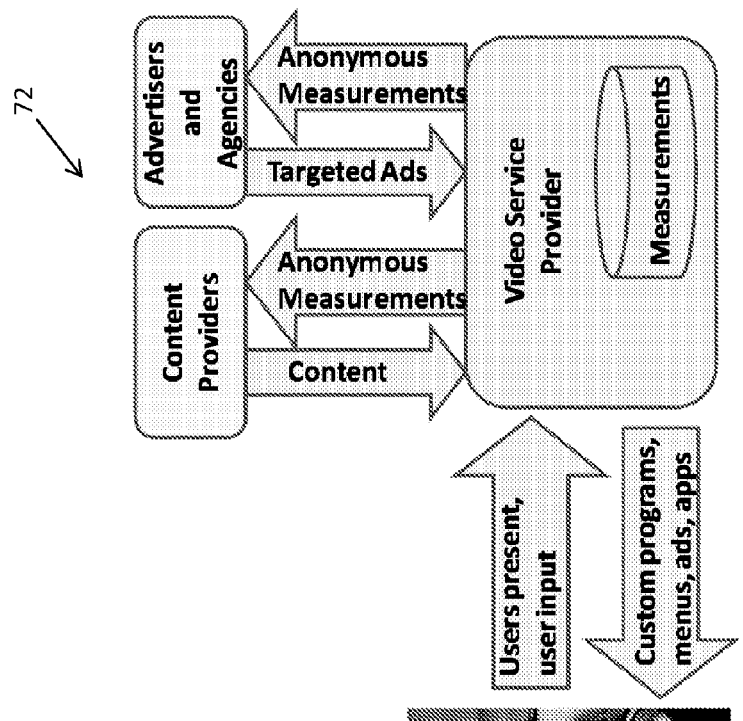
FIG. 6 illustrates a presence detection system in accordance with one non-limiting aspect of the present invention.

FIG. 6 illustrates a presence detection system 72 in accordance with one non-limiting aspect of the present invention. The presence detection system 72 is shown to be configured to facilitate delivery of video services for exemplary purposes as a similar configuration may be used to facilitate personalizing non-video content. The system may be configured to enable one or more of the following operations:

- The TV, the set-top box, a mobile phone or tablet, or other device could automatically detect who is watching a particular TV, through any number of detection and verification mechanisms
- The user could control preference settings that allows them to turn on or off aspects of the customization of the video service for their preferences and behaviors.
- The service could unobtrusively alert the user(s) that the service is being customized for them.
- The TV could automatically tune to the channel or program that the user usually watches at the current time of day or day of week, or to the channel or program that was most recently viewed.
- The channel, VOD, application, and game menus can be customized to show channels, titles, and apps usually viewed by the user, or to show recommendations through a recommendation engine that learns the preferences of each individual user from preference settings and user viewing history. The listings and recommendations could also be influenced by the behavior of others in the user's social network.
- Users can be invited to rate titles, programs, movies, apps, and games, and comment on them.
- The automatic detection of the user's identity can be leveraged to connect the user with other users who are also interacting with the service at that time, especially those that belong to the user's social network, and the user can be invited to interact with other users through applications on the TV or on companion devices such as phones, tablets, and PCs.
- The use of the service can be measured, whether programs, apps, and games are used on the TV, the PC, the tablet, or the phone, and the resulting measurement data can be used to customize the user interface, drive the recommendation engine, target advertising to the specific user(s) interacting with the service.
- Measurement data can also be enhanced with other marketing databases and anonymized and aggregated, and can then be shared with programmers, studios and networks to assist them in understanding the size, composition, and engagement of their audience and the number of ad impressions achieved by their programming through each kind of device.
- Anonymized and aggregated measurement data can also be used by advertisers and agencies to craft customized and micro-targeted ad campaigns.
- Anonymized and aggregated measurement data can be sold to other marketing agencies, within the fully disclosed limits of the personalization program, and within the limits of the law.
- Measurement data can be used by the service provider to guide its own content licensing and packaging program, to more successfully market video services bundles to its own subscribers, and can help the service provider market particular programming bundles to specific end users.
- The users could be enticed to opt in to the service not only for the improved user experience, but the service provider could share its financial benefit with the end user through reduced subscription fees.

One component of a personalized service is the ability to recognize who is interacting with the service. Of course, this can be done by forcing the user to "log in" to the service with a username or a username and password, but many users will not have the patience for this. The automated detection of the identity of the user interacting with the service would improve the user experience, and make it more likely that the user would opt in to the use of a personalized service.

There are many ways contemplated by the present invention to automatically detect the identity and presence of a user, including those shown in the table below:

| | Tool | Presence Detection | Identity Detection | Notes |
|---|---|---|---|---|
| 1 | Smartphone or Tablet with GPS and Internet Access | Potential methods include:<br>a. App prompts user to record location of TVs with GPS, and then app will report when the user is located near the TV via the Internet connection<br>b. When smartphone, tablet, or PC is used for viewing, the device itself can detect presence | Potential methods include:<br>a. Assuming that the mobile device's primary user is the viewer<br>b. Requiring that the user authenticate themselves through password protection, voice detection, fingerprint detection, facial recognition, or | Requires the user to have the mobile device with them while watching TV. Assuming the mobile device's primary user is present when the device is present is least intrusive but is a very weak identity detection method, but could be augmented with additional authentication |

-continued

| | Tool | Presence Detection | Identity Detection | Notes |
|---|---|---|---|---|
| | | | other identity detection method | before viewing restricted content. |
| 2 | Cellphone, Smartphone, or Tablet with Bluetooth | Mobile device reports presence to a Bluetooth-capable set top box, and set top reports presence to network servers via EBIF or DSG | Same methods as Row 1 | Likely requires deployment of a new set top box |
| 3 | Cellphone, Smartphone, or Tablet with Wi-Fi | Mobile device reports presence to a Wi-Fi-capable set top box, and set top reports presence to network servers via EBIF or DSG | Same methods as Row 1 | May require deployment of a new set top box |
| 4 | Standard remote control | User presses a button or combination of buttons on remote to indicate presence | Assume the user is who they claim to be, or require user to enter a PIN or Password, or use a biometric identity method | Not automated so users may neglect to report presence |
| 5 | Remote Control with motion detection | User has a personal gesture they can use to indicate presence | Assume the user is who they claim to be, or require user to enter a PIN or Password, or use a biometric identity method | Not automated so users may neglect to report presence |
| 6 | Video Camera | Camera mounted on or within TV or viewing device can do facial recognition to detect presence | Facial recognition can be used to recognize specific users. Recognition can be performed locally or in the cloud | Automated and not easily spoofed |
| 7 | Microphone | Microphone mounted on or within TV or viewing device, or within a companion device such as a mobile phone or tablet, can detect presence of voices | Voice recognition can be used to recognize specific users. Recognition can be performed locally or in the cloud | Automated but can possibly be spoofed with a voice recording |
| 8 | Fingerprint Reader | Fingerprint reader at set top box, in TV, or on a companion device can be used to report presence | Fingerprint reader can identify specific users | Not automated so users may neglect to report their presence, or report when they are leaving the room |
| 9 | Custom wireless token or RFID device | Inexpensive device can automatically report user presence whenever queried by set top box or viewing device | Relies on the token owner to be the person who is carrying the token | Automated and can be repeatedly polled to make sure the user is still in the room at specific times, but tokens are easily stolen or lost. |

Video service users are likely the choose a personalized service if:
The service clearly offers an improved user experience,
They feel they understand the terms of service,
They feel that the benefits of the service are worth the revelation of some restricted private data, and
They feel that using the service does not require them to do any extra work.

Therefore, service providers should be clear about the data that is collected, how long it is kept, how it is anonymized, and the limits on how the data will be shared.

Figure 7:
FIG. 7 illustrate display of a token in accordance with one non-limiting aspect of the present invention.

As a demonstration of the transparency associated with a personalized video service, and as a check on the accuracy of the automated personalization systems, the service could display a small icon, token, or name on the viewing screen to indicate which user or users have been identified in the room, and to indicate for whom the service is being personalized. FIG. 7 illustrate display of such a token 74 in accordance with one non-limiting aspect of the present invention. Such a feature can serve as a reminder to the user that the service is being personalized and that personal experience is different, and better than, competing services.

One non-limiting aspect of the present invention contemplates measurement being a foundation of a personalized service. The measurement data should not only serve the needs of advertisers, but should also serve the needs of programmers, studios, app and game developers, service providers, and end users.

The following data elements could be measured for each end user:
Title, identifier, date, time, content quality, delivery network, and viewing device for each movie, show, program, clip, advertisement, portal, web page, screen, game, and app viewed and interacted with, and the duration of each interaction.
The user rating for the ID of each movie, show, program, clip, advertisement, portal, web page, screen, game, or app viewed and interacted with, if available.

What the user was doing in their last session, and especially any programs that were paused or stopped before completion, so that the user can pick up where they left off.

The identities of the friends in each user's social network, and the user's groupings of those friends.

Who was present in the room with the user when the user viewed each movie, show, program, clip, advertisement, portal, web page, screen, game, or app.

Which social network contacts were present "on the network," and whether the user was aware they were present on the network, during the viewing of specific content.

The web sites that were visited and the duration of each visit, based upon measurements on an associated broadband Internet service.

Measuring users that saw an ad and later bought an associated product, either through an interactive TV application or through the Web.

Measuring performance of the user experience by recording speed of page loading or video startup, quality of video viewed, bit rate of video viewed, and number and timestamp of re-buffering events.

Measurement data can be enhanced by combining the data collected from the use of the personalized video service with other marketing data sources to determine age, income, recent purchases, hobbies, interests, seasonal behaviors, and other demographic information.

When combining data about a specific individual, the data should be handled carefully with regard to privacy and anonymization, and processes should be defined to ensure that no personally identifying information is stored, so that a security breach could not reveal that a named individual watched a particular program or visited a particular website. Instead, each video session should simply be associated with a set of users, with each user belong to certain behavior categories for marketing purposes.

Measurement data can be used to customize a user's experience, including

Driving a recommendation engine (user's who liked this also liked that . . . )

Setting the default program to present when the service is activated.

Automatically presenting the most frequently viewed channels and on-demand programming on lists and menus for the user's convenience.

Automatically presenting programs of interest for the user(s) without requiring a channel change or new program selection.

Automatically arranging menus, thumbnails, and viewing frames according to this particular user's preferences Measurement data can be used to add value for content providers in multiple ways, including:

Assisting the content provider in knowing how many ad impressions were achieved through their programming.

Helping the content provider better characterize the audience for a particular program, including size and distinguishing characteristics of the audience.

Helping the content provider to determine what new programming to develop and offer to the market.

Achieving higher revenue per ad avail through targeting.

Measurement data can be used to add value for advertisers in multiple ways, including:

Reaching targeted users with fewer paid impressions.

Tracking users through an integrated view of both TV and Internet behavior.

Tracking ad impressions for each of many different microcategories of viewers.

Tracking ad effectiveness by measuring users who viewed an ad and also purchased a product, filled out a form, signed a petition, visited a web site, or took any other specified action.

Rewarding the content provider and/or service provider for their role in producing the desired action (pay-for-performance advertising, referral bonuses).

Analytics and reporting, for example cost per thousand impressions (CPMs) to reach each category of viewers, relative performance of individual ads, impressions by geography, impressions within each program or web site, conversions within each demographic group and geography, and conversions from each program or web site.

Measurement data can be used to add value for service provider applications in multiple ways, including allowing service providers to use measurement data for Determining better program bundling strategies.

Determining which content is worth licensing and distributing.

Achieving higher revenue per ad avail through targeting.

Creating a greater preference for content providers to distribute their content through a distribution channel with advanced measurement capabilities.

All of the measurement applications for advertisers also apply to service providers that advertise their own products and services.

Measurements can be enhanced by combining data from several different measurement sources, some of which are outside of a service provider's domain. For example, it could be useful to an advertiser to know that a viewer who likes to watch Seinfeld also takes an annual trip to Hawaii every Spring, and therefore might be a good target for airline and travel ads each Winter.

However, the service provider measurement infrastructure might only reveal the preference for Seinfeld, while a third-party marketing database might hold the data about the user's Spring travels. A "one-way function" is contemplated to facilitate combining these two data points without either the service provider or the third-party marketing database revealing the identity of the user. The "one-way function" may be a function that is easy to compute, but for which the inverse is very hard to compute. The application of one-way functions to anonymization would allow multiple measurement sources to use personally identifying information such as name, address, and account number to compute an encoded identifier for an end user which cannot be easily converted back into the original personally identifying information. The encoded identifier would appear to be a random sequence of numbers, so that should the encoded identifier fall into the wrong hands, the original personally identifying information would be very difficult to determine.

If multiple contributing data sources use the same one-way function to compute an encoded identifier, then each party could contribute what they know about an end-user's behavior to a common data pool by reporting the encoded identifier along with the end-user's actions, but not reporting any personally identifying information. In the example of the Seinfeld viewer, the service provider could report that end user 8A74 21F2 B635 3491 watches Seinfeld, while a third party marketing database could report that the same user always takes a Spring vacation that requires air travel, while neither party reveals the name, address, or account number of the individual.

The contemplated personalized video service can place a great deal of control in the hands of the user of the service, allowing them to customize how much information they reveal, and how the service is customized to their preferences, including the following:

Personalization on/off.

Recognize and use day of week and time of day usage patterns.

Limitations on uses of measurement data.

Share/Do not share outside of service provider.

Share/Do not share personal information with social network (by group).

Parental Controls.

Pre-set default channel tuning or learn preferred channels for preferred channel list.

Turn on or off automatic presentation of recommended content.

Allow use of Internet measurement with video measurement data.

Turn on or off interactive TV applications or other interactive capabilities.

Turn on or off subscriptions to particular programs, actors, directors, studios, channels, app developers, friends, or artists.

Turn on or off closed captioning.

Turn on or off language translation.

Enable or disable web browsing.

Enable or disable particular programs or channels.

As supported above, one non-limiting aspect of the present invention contemplates automatically detecting the presence and identity of the user(s) of a network based service, and using the knowledge of the user's presence to customize and personalize the service according to the user's preferences, usage history, and/or additional externally gathered information regarding the user(s).

One non-limiting aspect of the invention contemplates automatically detecting the presence of the individual(s) who are interacting with a network-connected service such as television viewing or social networking, and then uses the knowledge of the identity of the user(s) present to personalize the service for the user, and generate custom and de-identified usage reports for the service provider, advertisers, marketers, content packagers, and content creators.

The present invention uses any of several different methods to detect user presence, including but not limited to:

radio frequency identification (RFID) technology,

Bluetooth, mobile smart phone and tablet devices using Wi-Fi, 3G, LTE or other wireless networks biometric recognition techniques, including facial recognition, body shape recognition, voice recognition, and fingerprint recognition manual sign-in by the user In the example of using RFID identity and presence detection in connection with a personalized television service, the user carries or wears an RFID Tag that has been registered as belonging to the user's identity in the Presence and Identity database. There is also an RFID reader that is co-located with a television and powered to read RFIDs at a distance appropriate to the room in which the television resides. When the user walks into the television room, the RFID reader detects the presence of the RFID tag and reports the identifier for that RFID tag to the Presence and Identity Web server over Network A. Network A is likely to be an Internet Protocol (IP) network, but is not limited to being an IP network.

The Presence and Identity Web Server may record the presence of the RFID Tag and associates that RFID tag to the user whose identity was registered for that RFID Tag, and report to the Personalized TV Service Application that the RFID tag associated with the identified user is present in the room. When the user leaves the room, the RFID reader detects the absence of the user and reports that the user has left the room to the Presence and Identity Server. The Presence and Identity Server reports the user's absence to the Personalized TV Service Application, and the personalized TV service is de-activated and normal TV service resumes.

Aspects of the present invention contemplate one or more of the following:

Enabling a service provider to present a better user experience to the end user.

Enabling a service provider to provide better and more targeted advertising opportunities to advertisers, with greater confidence about the people who actually watched the programming and advertisements.

Enabling a service provider to share valuable usage statistics with marketers, advertisers, agencies, content packagers, and content creators.

Enabling a service provider to analyze the ways that specific categories of users use its service, so that the service provider can improve and customize the service for different categories of users.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for personalizing network services for a dwelling, the dwelling having a plurality of rooms and a plurality of network devices, at least one network device being positioned within each one of the plurality of rooms to interface services with occupants of the corresponding room, the system comprising:

a plurality of presence detecting devices associated with one or more of the network devices, each presence detecting device being configured to detect presence of occupants within the rooms of the dwelling, the presence detecting device being configured to anonymously and uniquely identify one or more occupants with randomly generated numbers according to wireless signaling emitted from occupant carried wireless devices;

at least one personalization device associated with the dwelling, the personalization device being configured to uniquely personalize services according to an identity of one or more occupants identified to be present with the presence detecting devices, each identity being determined by relating the randomly generated numbers to personalization information for registered occupants, the personalization information being unavailable to the presence detecting devices, the personalization device personalizing services for the network devices according to the one or more occupants identified to be present within the corresponding room, thereby providing room-level personalization of services;

wherein the presence detecting devices are configured to facilitate uniquely identify the one or more occupants with transmission of an arrival message, the arrival message announcing the room within which the one or more occupants are present and the randomly generated numbers;

wherein the presence detecting devices are configured to transmit the arrival message as a part of a POST defined according to Hypertext Transfer Protocol (HTTP) and carried over an Internet Protocol (IP) network, the arrival message being received at a presence and identity services server located remotely from the dwelling, the presence and identity services server interacting with a presence and identity database to determine the personalization information, the presence and identity database storing the personalization information for registered occupants having previously completed a registration process and such that the personalization information is unavailable to the presence detecting devices;

wherein the personalization device is configured to personalize services as function of personalization information included in a personalization message, the personalization message being received from a personalization application server located remotely from the dwelling, the personalization application server generating the personalization message according to corresponding information received from the presence and identity services server following the presence and identify services server interacting with the presence and identify database to determine the personalization information; and wherein the personalization device is configured to receive the personalization message as part of a trigPresence message carried over a non-IP network.

2. The system of claim 1 wherein the personalization device is configured to receive the trigPresence message as defined according to Enhanced Binary Interchange Format (EBIF).

3. The system of claim 1 wherein each presence detecting device is configured to limit detection of the wireless signals to a wireless range approximating a size of the room within which each presence detecting device is positioned, the detecting device lacking capabilities sufficient to recover the personalization information from the trigPresence message.

4. The system of claim 1 wherein the occupant carried wireless devices are configured to automatically emit the wireless signaling after entering one of the rooms, the automatic emittance of the wireless signaling being performed without requiring the carrying occupant to contemporaneously manipulate the wireless device and without requiring the carrying occupant to contemporaneously engage one of the presence detecting devices through manual operation, the occupant carried wireless devices being configured to generate the randomly generated numbers used to identify the occupants.

5. A method for personalizing services using presence detection comprising:

determining presence of a first user and a second user relative to a first presence detecting device, the first and second users being ones of a plurality of users and the first presence detecting device being one of a plurality of presence detecting devices, each of the plurality of presence detecting devices being positioned in close proximity to one of a plurality of network devices in order to detect presence of the plurality of users relative to the corresponding one of the plurality of network devices, the plurality of presence detecting devices being configured to wirelessly detect presence of the plurality of users, the plurality of presence detecting devices communicating an arrival message through a first network interface to announce detected presence of the plurality of users relative to the plurality of network devices, the first presence detecting device communicating a first arrival message to announce presence of the first user as having higher priority over the second user at a first network device of the plurality of network devices following completion of a conflict resolution process used to determine which one of the first and second users should control personalization; and personalizing services associated with the first network device based on detected presence of the first user with the first presence detecting device, the first network device being configured to communicate through a second network interface, the first network device receiving a personalization message through the second network interface, the first network device personalizing services according to personalization information included within the personalization message, the personalization information being unique to the first user detected within the presence of the first network device;

detecting presence of the plurality of user as a function of wireless signaling transmitted from portable wireless devices configured to be carried by the plurality of users, whereby the first arrival message includes a first random number for identifying the first user, the first random number being selected over a second random number determined for identifying the second user, the first presence detecting device determining the first and second random numbers upon determining presence of the first and second users;

the first presence detecting device transmitting the first arrival message as a part of a POST defined according to Hypertext Transfer Protocol (HTTP) and carried over an Internet Protocol (IP) network, the first arrival message being received at a presence and identity services server located interacting with a presence and identity database to determine the personalization information, the presence and identity database storing the personalization information for registered users having previously completed a registration process and such that the personalization information is unavailable to the presence detecting devices;

the first network device personalizing services as function of personalization information included in the personalization message received from a personalization application server located remotely from the dwelling, the personalization application server generating the personalization message according to corresponding information received from the presence and identify services server following the presence and identify services server interacting with the presence and identify database to determine the personalization information; and wherein the personalization device receives the personalization message as part of a trigPresence message carried over a non-IP network.

6. The method of claim 5 further comprising:

personalizing services associated with a secondary device in proximity to the first network device based on detected presence of the first user with the first presence detecting device, the secondary device being used to operate a secondary application where a plurality of application events are timed relative to content being accessed through the first network device;

determining a control change for the first network device resulting from a user input, the control change causing the first network device to implement a corresponding operational change;

constructing a notification message sufficient to facilitate notifying the secondary device of the control change, the notification message being constructed without the first network device being aware of the secondary device;

constructing the notification message with an application server located at a headend configured to provide television signaling to the first network device, the first network device being configured to process the television signaling from the headend for output; and the application server constructing the notification message according to the Extensible Messaging and Presence Protocol (XMPP) and forwarding the notification message to an XMPP server for communication to the secondary device.

7. The method of claim 5 further comprising personalizing services to include providing a greeting identifying the first user through the first network device and de-personalizing services associated with the first network device upon the first presence detecting device ceasing to detect presence of the first user.

8. The method of claim 7 further comprising de-personalizing services associated with the first network device according to de-personalization information included in a de-personalization message communicated to the first network device, the de-personalizing including interfacing a farewell message with the first user through the first network device.

9. The method of claim 5 further comprising the wireless signaling being transmitted from the portable wireless devices indirectly to the one or more of the presence detecting devices via wireless signaling carried over a local network within a dwelling, the local network utilizing wireless signaling having a range limited to a vicinity of the dwelling.

10. The method of claim 5 further comprising the first network interface being a cable modem and the second network interface being a set top box (STB).

11. A system for personalizing television services for at least a plurality of televisions positioned within different rooms of a dwelling, the system comprising:
 a plurality of presence detecting devices configured to determine occupant presence within the rooms as a function of occupant originating wireless signaling, the presence detecting devices being configured to generate an arrival message to announce arrival of each occupant within one of the rooms and to generate a departure message to announce departure of each occupant from one of the rooms;
 at least one personalization device configured to personalize television services on a room-by-room basis by personalizing television services for each television according to occupant originating wireless signaling indicating presence in the corresponding one or more rooms
 wherein the presence detecting devices are configured to anonymously and uniquely determine an identity associated with the occupants with randomly numbers determined according to wireless signaling emitted from occupant carried wireless devices, each identity being sufficient for relating the randomly generated numbers to personalization information for registered occupants, the personalization information being unavailable to the presence detecting devices:
 wherein the presence detecting devices are configured to transmit the arrival messages as a part of a POST defined according to Hypertext Transfer Protocol (HTTP) and carried over an Internet Protocol (IP) network, the arrival messages being received at a presence and identity services server located remotely from the dwelling, the presence and identity services server interacting with a presence and identity database to determine the personalization information, the presence and identity database storing the personalization information for registered occupants having previously completed a registration process;
 wherein the personalization device is configured to personalize services as function of personalization information included in a personalization message, the personalization message being received from a personalization application server located remotely from the dwelling, the personalization application server generating the personalization message according to corresponding information received from the presence and identity services server following the presence and identify services server interacting with the presence and identify database to determine the personalization information; and
 wherein the personalization device is configured to receive the personalization message as part of a trigPresence message carried over a non-IP network.

12. The system of claim 11 wherein the trigPresence message is defined according to Enhanced Binary Interchange Format (EBIF).

13. The system of claim 11 wherein the presence detecting devices are configured to perform conflict resolution process in the event multiple occupants are determined to be simultaneously present within one of the rooms whereby the corresponding television services are personalized accordingly to one of the multiple occupants determined by the conflict resolution process to have priority.

14. The method of claim 5 further comprising personalizing services associated with a secondary device in proximity to the first network device based on detected presence of the second user with the first presence detecting device.

* * * * *